Patented Dec. 31, 1929

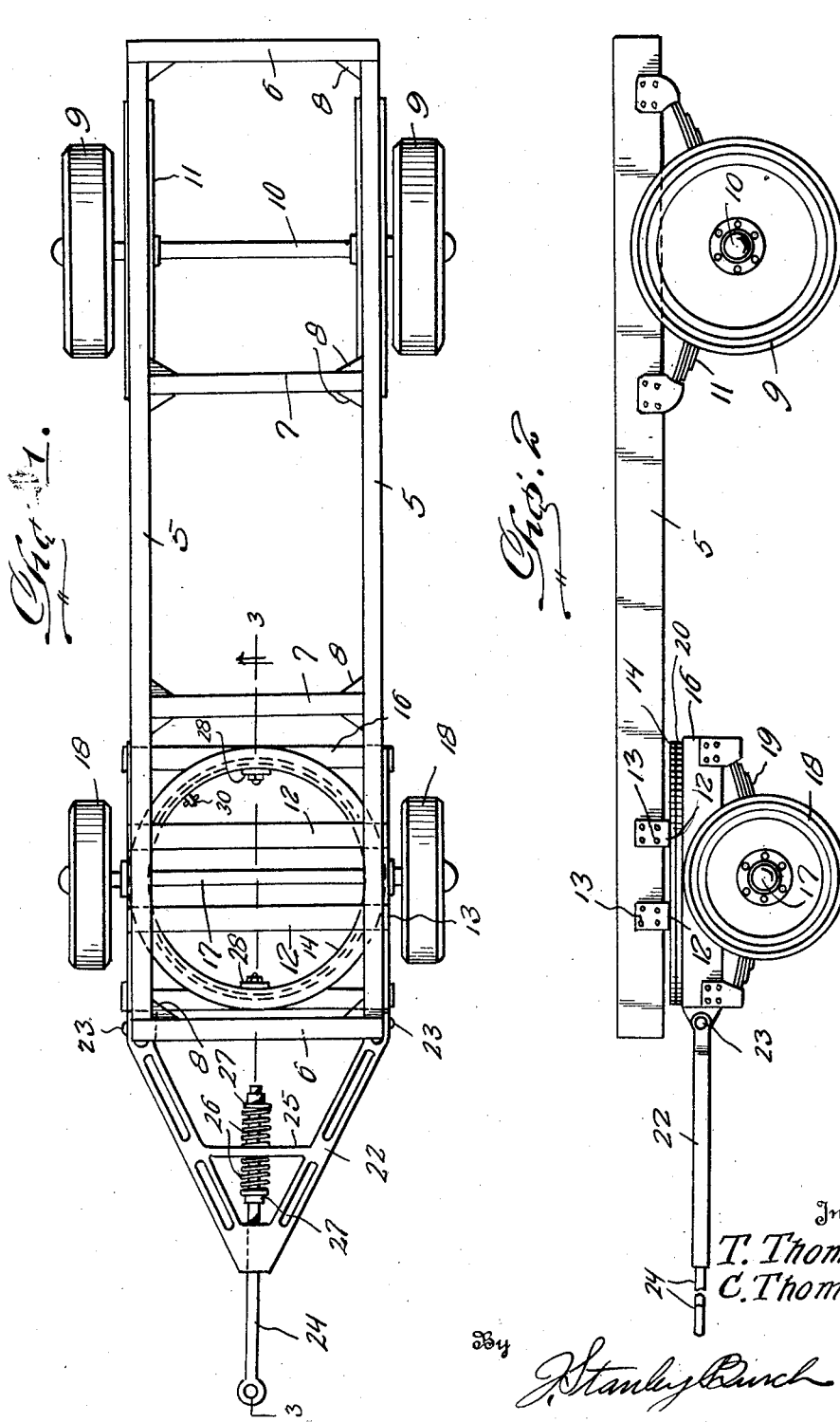

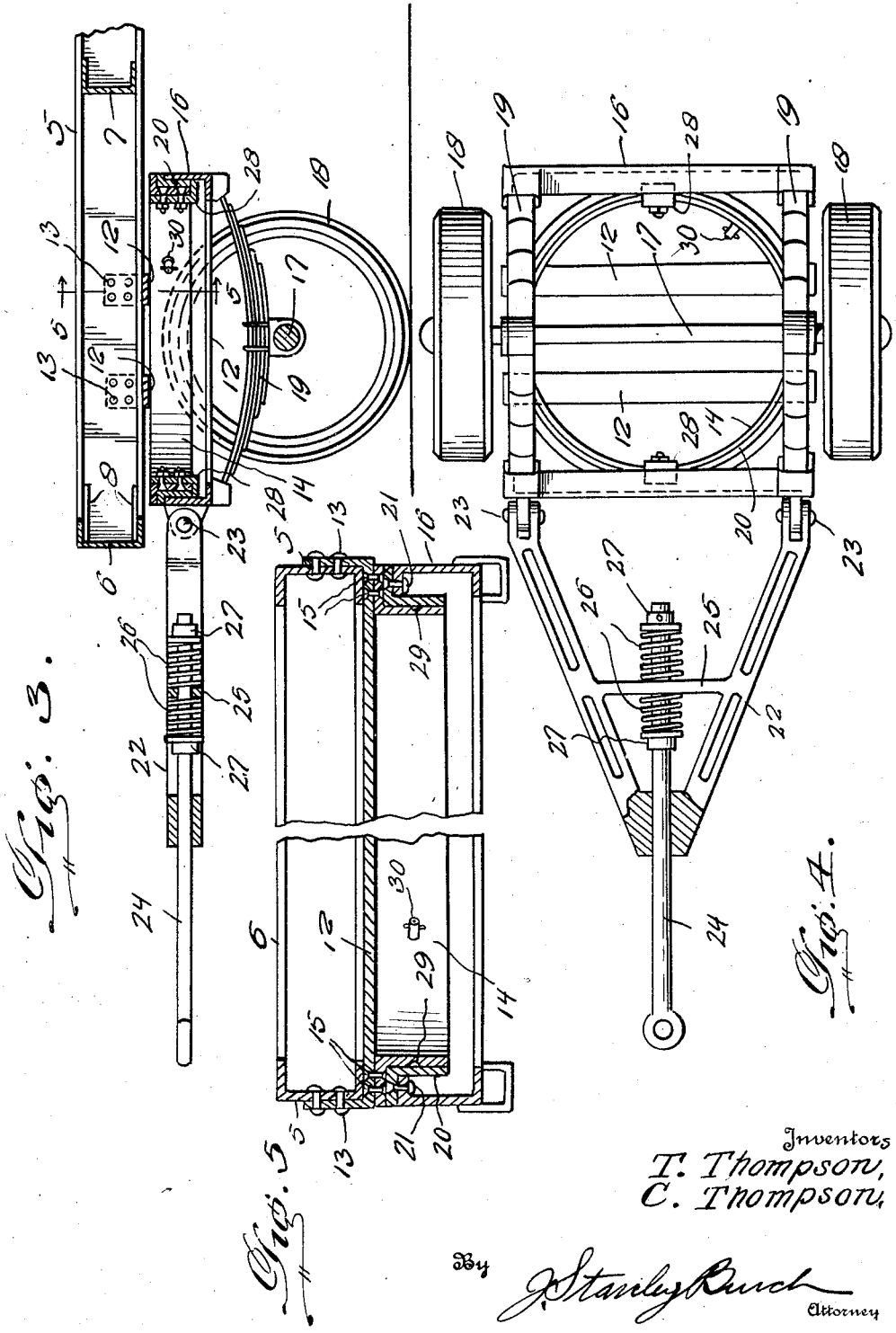

1,741,445

UNITED STATES PATENT OFFICE

THURM THOMPSON AND CLEVE THOMPSON, OF PORTERVILLE, CALIFORNIA

TRAILER TRUCK

Application filed May 31, 1928. Serial No. 281,919.

This invention relates to trailer trucks such as are used for fast traffic, and has more particular reference to an improved fifth wheel construction and draft means for trailer trucks of this kind.

The primary object of the present invention is to provide a fifth wheel construction by means of which side sway and whipping of the trailer is effectively prevented, thereby forcing the trailer to track in true line with the pulling vehicle at any speed of travel.

A further object is to provide a fifth wheel construction which will prevent rocking of the trailer body or lateral tilting of the trailer when the load is unevenly distributed on the trailer body.

A still further object is to provide a simple and durable fifth wheel construction which is devoid of roller bearings, king bolt, and other objectionable wearing parts.

Another object is to provide a fifth wheel construction which has co-acting circular bearing members that extend the full width of the front portion of the trailer frame, thereby insuring maximum freedom of movement for steering and causing the draft or pull to be taken by one-half of the bearing members throughout such width of the front portion of the trailer frame, so that whipping and side sway of the trailer is prevented.

Still another object is to provide for connection of the trailer hitch directly at the front of the fifth wheel so that the draft or pull is transmitted directly to the load and not to the wheels or axle considerably below the fifth wheel.

The invention consists in the novel form, combination and arrangement of parts hereinafter more fully described, shown in the accompanying drawings and claimed.

In the drawings:—

Figure 1 is a top plan view of a trailer truck chassis embodying the present invention.

Figure 2 is a side elevational view thereof.

Figure 3 is an enlarged fragmentary vertical longitudinal section on line 3—3 of Figure 1.

Figure 4 is a bottom plan view of the construction shown in Figure 3, partly in section; and Figure 5 is an enlarged vertical transverse section, taken on line 5—5 of Figure 3, and partly broken away.

Referring more in detail to the drawings, the trailer embodies a chassis frame including side rails 5 rigidly connected by transverse end rails 6 and intermediate rails or braces 7, preferably of channel iron and braced at the joints by gusset plates 8. The chassis frame is supported at its rear end by ground wheels 9 mounted on the ends of the fixed rear axle 10, the usual leaf springs 11 being interposed between the frame and the axle to cushion the load placed on the trailer.

In accordance with the present invention, the side chassis rails 5 are connected near their front ends by means of a pair of spaced parallel cross bars 12. which extend across at the bottom of the chassis frame and have their ends rigidly attached to the side rails 5 as at 13. An annulus or ring 14, of a diameter substantially the same as the width of the front end of the chassis frame, is rigidly secured in a horizontal position to the under side of the cross bars 12. This ring 14 is of angular cross-section so as to present a top horizontal flange forming the upper annular horizontal bearing member of the fifth wheel, and a vertical flange forming the inner annular vertical bearing member of the fifth wheel. The top flange of the ring 14 is riveted or otherwise rigidly secured as at 15 to the ends of the cross bars 12 at the sides of the chassis frame.

A steering unit supports the front end of the chassis frame, and this unit embodies a horizontal rectangular sub-frame 16 of substantially the same width as the front end of the chassis frame and mounted on the front axle 17 which has the usual front steering and supporting wheels 18 journaled on the ends thereof. The usual type of leaf springs 19 are interposed between the sub-frame 16 and the front axle 17 to cushion the load placed on the trailer, and fitted and rigidly secured in the sub-frame 16 is a second annulus or ring 20. The ring 20 is of angular cross section so as to present a top horizontal flange forming the lower annular horizontal bearing member of the fifth wheel upon which the horizontal flange of the ring 14 rotatably rests, and a vertical flange forming the outer annular vertical bearing member of the fifth wheel within which the vertical flange of the ring 14 rotatably fits. The top flange of the ring 20 is riveted or the like as at 21 on and to the sub-frame 16.

A hitch is provided for connecting the steering unit of the trailer to the pulling vehicle, and this hitch preferably embodies a bail-like member 22, having its ends pivoted as at 23 to the front of the sub-frame 16 adjacent the sides thereof for free vertical swinging movement, and a draw bar 24 slidable longitudinally through the front intermediate portion of the bail member 22 and a cross brace 25 of the latter, helical compression springs 26 being placed on the draw bar between abutments 27 on the rear end portion of the latter and opposite sides of the cross brace 25, to absorb shocks and jars incident to sudden starting and stopping of the pulling vehicle.

In use, it will be seen that the ring 20 will turn about the ring 14 as the hitch is swung horizontally. Due to the form and size of the rings, ease of turning is had and side sway and whipping of the trailer is prevented, thereby insuring effective steering so that the trailer wheels are maintained in alinement with the line of draft at all times. Moreover, the pull is always taken on one-half of the fifth wheel for the full width of the trailer frame and directly from the sub-frame above the axle and wheels, thereby enhancing the ease of steering and the prevention of whipping of the trailer. Furthermore, the construction is extremely simple and durable, and embodies no king bolt, roller bearings, or other objectionable wearing parts.

In order to prevent the ring 14 from lifting out of the ring 20, a plurality of angle clips or lugs 28 are fastened to the inside of said ring 14 with their lower flanges projecting outwardly and bearing on the lower edge of the ring 20. The ring 14 also preferably has an annular circumferentially extending lubricant-retaining groove 29 in the outer face of its vertical flange, and an internally arranged lubricating connecting 30 may be provided on the ring 14 in communication with the groove 29 to facilitate the supplying of lubricant to the latter. In this way, the contacting faces of the rings may be lubricated to minimize friction and wear.

Minor changes may be made without departing from the spirit and scope of the invention as claimed.

What we claim as new is:

In a trailer vehicle, a chassis frame having rear supporting wheels, an annulus of substantially the same diameter as the width of the front end portion of the chassis, an annular flange extending outwardly from the upper edge of the annulus and secured to the under side of said frame, a front axle having steering and supporting wheels thereon, a sub-frame mounted on the front axle, an annulus, a laterally extending annular flange formed on the upper edge of the second-mentioned annulus and secured to the top portion of the sub-frame, said first-mentioned annulus being rotatably fitted within the second-mentioned annulus, the flange of the first-mentioned annulus resting on the flange of the second-mentioned annulus, an angular lug secured to the inner face of the first-mentioned annulus, the horizontal portions of said lug being disposed directly beneath the lower edges of said annuli.

In testimony whereof we affix our signatures.

THURM THOMPSON.
CLEVE THOMPSON.